United States Patent [19]

Sasaki

[11] Patent Number: 5,930,524

[45] Date of Patent: Jul. 27, 1999

[54] SYSTEM FOR SELECTIVE DISPLAY OF PERIPHERAL I/O DEVICE STATUS FOR EACH APPLICATION PROGRAM BASED ON A LIST OF APPLICATION PROGRAMS

[75] Inventor: Ichiro Sasaki, Aichi-ken, Japan

[73] Assignee: Brother Kogyo Kabushiki Kaisha, Nagoya, Japan

[21] Appl. No.: 08/864,400

[22] Filed: May 28, 1997

[30] Foreign Application Priority Data

May 29, 1996 [JP] Japan ..................................... 8-135194

[51] Int. Cl.$^6$ ................................................. G06F 13/376
[52] U.S. Cl. .......................... 395/839; 395/838; 395/837; 395/674; 395/310
[58] Field of Search ..................................... 395/113, 835, 395/836, 851, 838, 839; 364/400.01; 345/168; 340/506

[56] References Cited

U.S. PATENT DOCUMENTS

4,232,306  11/1980  Mizuno ..................................... 340/506
5,121,113  6/1992  Kedge et al. ............................ 345/168
5,703,794  12/1997  Heddle et al. ...................... 364/400.01
5,706,411  1/1998  McCormick et al. ................... 395/113

Primary Examiner—Thomas C. Lee
Assistant Examiner—Michael G. Smith
Attorney, Agent, or Firm—Oliff & Berridge, PLC

[57] ABSTRACT

A method for controlling whether or not to display the status monitor of a device. When a certain application program outputs a printing command and the status monitor of the printer is set to be displayed, data indicative of the application program is first obtained and compared with a list of problem application programs. If the name is not in the list, then the printing status monitor is displayed. However, if the name is found in the list, the status monitor is not displayed. This method increases efficiency of work for the user and prevents such problems as the computer hanging up or the programs being forcibly closed.

22 Claims, 4 Drawing Sheets

SYSTEM FOR SELECTIVE DISPLAY OF PERIPHERAL I/O DEVICE STATUS FOR EACH APPLICATION PROGRAM BASED ON A LIST OF APPLICATION PROGRAMS

BACKGROUND OF THE INVENTION

1. Field of the Invention

The present invention relates to a method for driving a device such as a printer with a device driver and for controlling a display device to display a status monitor indicative of a status of the device being driven.

2. Description of the Prior Art

In recent years, operating systems capable of simultaneously running a plurality of application programs on one computer have become common. Examples of these operating systems currently in use include the multitasking operating system products from Microsoft Corporation, such as Windows 3.1, Windows 95, and Windows NT, as well as UNIX operating system.

These types of operating systems allow a user to work on different types of application programs simultaneously with one computer and allow data to be moved directly between the application programs, providing an extremely efficient environment for data processing.

Software called "device drivers" have been incorporated with recent computers, not limited to those using the above-described operating systems such as printers, scanners, facsimile machines, and the like, in order to handle the integration of various devices with the computer and to provide interface between the computer and its devices.

In order to allow the computer to control a printer, for example, a printer driver program for interfacing with the printer has to be previously placed in a memory as a resident program. When the user attempts to print data through operating an application program, the operating system receives printing commands from the application program, and activates the printer driver resident in the memory to control the printing process.

SUMMARY OF THE INVENTION

The device driver, such as the above-described printer driver, is designed to create a monitor display area, such as a window, on the screen of a display device such as a CRT display to inform the user of the status of the device. For example, the printer driver is designed to create a new monitor display area for monitoring the printer status on the screen of the display device over the already-displayed application program area. This newly-created monitor display area provides such messages as "Printing," "Printing page n," "Paper jam has occurred," and "Out of paper."

It is noted, however, that when this type of monitor display area (hereinafter referred to as "status monitor") is displayed in the multitasking operating system, occasionally the computer hangs up, the device driver-activating application program is forcibly closed or terminated, or other already-activated application programs are forcibly closed or terminated. When this type of problem or trouble occurs, all data created in the application programs is lost, amounting to a major problem in work efficiency.

The probable cause of this problem is as follows.

The device driver diverts an area of a video RAM (or graphic RAM) to a hard disk or the like, and then uses the video RAM area to display the status monitor. These processes of diverting the video RAM to the hard disk and of using the video RAM to display the status monitor create a conflict with the process of a certain application program that is running at the same time, rendering further processing by the application program or the device driver impossible.

This problem of the computer hanging up or processes being stopped does not occur with all application programs, but only with certain application programs not designed to handle such problems. For this reason, it is conceivable to design the device driver so as to allow the user to choose whether or not to display the status monitor.

However, the above-described problems may still possibly occur when a newly-installed application program is executed while the device driver is executed. Further, when the user chooses not to display the status monitor, the printer's status will not be displayed on the computer screen even when only those application programs that currently treat the above-described problems. In this case, the user is not immediately informed when a paper jam occurs or when the printer is out of paper, and can realize that a problem has occurred only after checking the printer directly and finding the job has not been properly performed.

In view of the foregoing, it is an object of the present invention to solve the above-described problems, and to provide a device driving and monitor display controlling method attaining more effective computer operations.

In order to attain the above and other objects, the present invention provides a method for driving a device while executing at least one application program, the method comprising the steps of: activating at least one application program; and activating a device driver, according to one of the activated at least one application program, thereby controlling a device corresponding to the device driver, wherein the device driver performs the steps of: (a) comparing one of the activated at least one application program with a list of predetermined application programs and providing comparing results; (b) determining, based on the comparing results, whether or not to control a display device to display a status of the device being driven by the device driver; and (c) driving the device while displaying the status of the device when determination made in step (b) is affirmative; and (d) driving the device while not displaying the status of the device when determination made in step (b) is negative. The application program, according to which the device driver is activated, may be compared with the list of the predetermined application programs. Alternatively, each of the at least one application program, which has been activated when the device driver is activated, may be compared with the list of the predetermined application programs.

According to another aspect, the present invention provides a control device for driving a device while executing at least one application program, the control device comprising: means for activating at least one application program; and means for activating a device driver, according to one of the activated at least one application program, thereby controlling a device corresponding to the device driver; and means for storing a list of predetermined application programs, wherein the device driver activating means includes: means for comparing one of the activated at least one application program with the list of predetermined application programs and providing comparing results; means for determining, based on the comparing results, whether or not to control a display device to display a status of the device being driven by the device driver; and means for driving the device according to the activated device driver while displaying the status of the device being driven when determination made by the determination means is affirmative and for driving the device according to the activated device driver while not displaying the status of the device being driven when determination made by the determination means is negative.

According to still another aspect, the present invention provides a program storage medium for storing data of a program indicative of a process for driving a device, the program comprising: (a) a program of comparing one of the at least one application program, which has been already activated when the process is started, with a list of predetermined application programs and providing comparing results; (b) a program of determining, based on the comparing results, whether or not to control a display device to display a status of the device being driven by the device driver; (c) a program of driving the device while displaying the status of the device when determination made in step (b) is affirmative; and (d) a program of driving the device while not displaying the status of the device when determination made in step (b) is negative.

The program storage medium may further store data of the list of the predetermined application programs. The list of the predetermined application programs may include a problem program list which lists data indicative of at least one problem application program which is determined to cause a problem when the problem application program and the device driver are activated while the device driver controls the display to display the status of the device being driven. Alternatively, the list of the predetermined application programs may include a problem-free program list which stores therein data indicative of at least one application program which is determined not to cause a problem when the application program and the device driver are executed while the device driver controls the display device to display the status of the device.

According to a further aspect, the present invention provides a method for driving a device, connected to a computer, while executing at least one application program, the computer being capable of simultaneously executing one or more application programs according to a multitasking operating system and which is capable of executing a device driver for driving the device according to the one or more application programs, the computer being connected to a display device which is capable of displaying a status monitor indicative of a status of the device driven by the device driver, the method comprising the steps of:

activating at least one application program; and activating a device driver, according to one of the activated at least one application program, thereby controlling a device corresponding to the device driver, wherein the device driver performs the steps of: (a) comparing one of the activated at least one application program with a list of predetermined application programs and providing comparing results; (b) determining, based on the comparing results, whether or not to control a display device to display a status of the device being driven by the device driver; and (c) driving the device according to the activated device driver while displaying the status of the device being driven when determination made in step (b) is affirmative; and (d) driving the device according to the activated device driver while not displaying the status of the device being driven when determination made in step (b) is negative.

According to still another aspect, the present invention provides a control device for controlling a device while executing at least one application program, the control device comprising: application program executing means capable of simultaneously executing one or more application programs according to a multitasking operating system; device driver executing means capable of executing a device driver for driving a device according to one of the one or more application programs; list storing means for storing a list of predetermined application programs; display control means capable of controlling a display to display a status of the device driven by the device driver; comparing means for comparing at least one of the executed one or more application program with the list of the predetermined application, programs; determining means for determining, based on the comparing results, whether or not to control the display to display the status of the device driven by the device driver; and driving means for driving the device according to the executed device driver while performing the determined control on the display.

DETAILED DESCRIPTION OF THE PREFERRED EMBODIMENTS

Preferred embodiments of a control device for attaining a monitor display control while driving a device according to the present invention will be described below while referring to the accompanying drawings.

Figure 1:
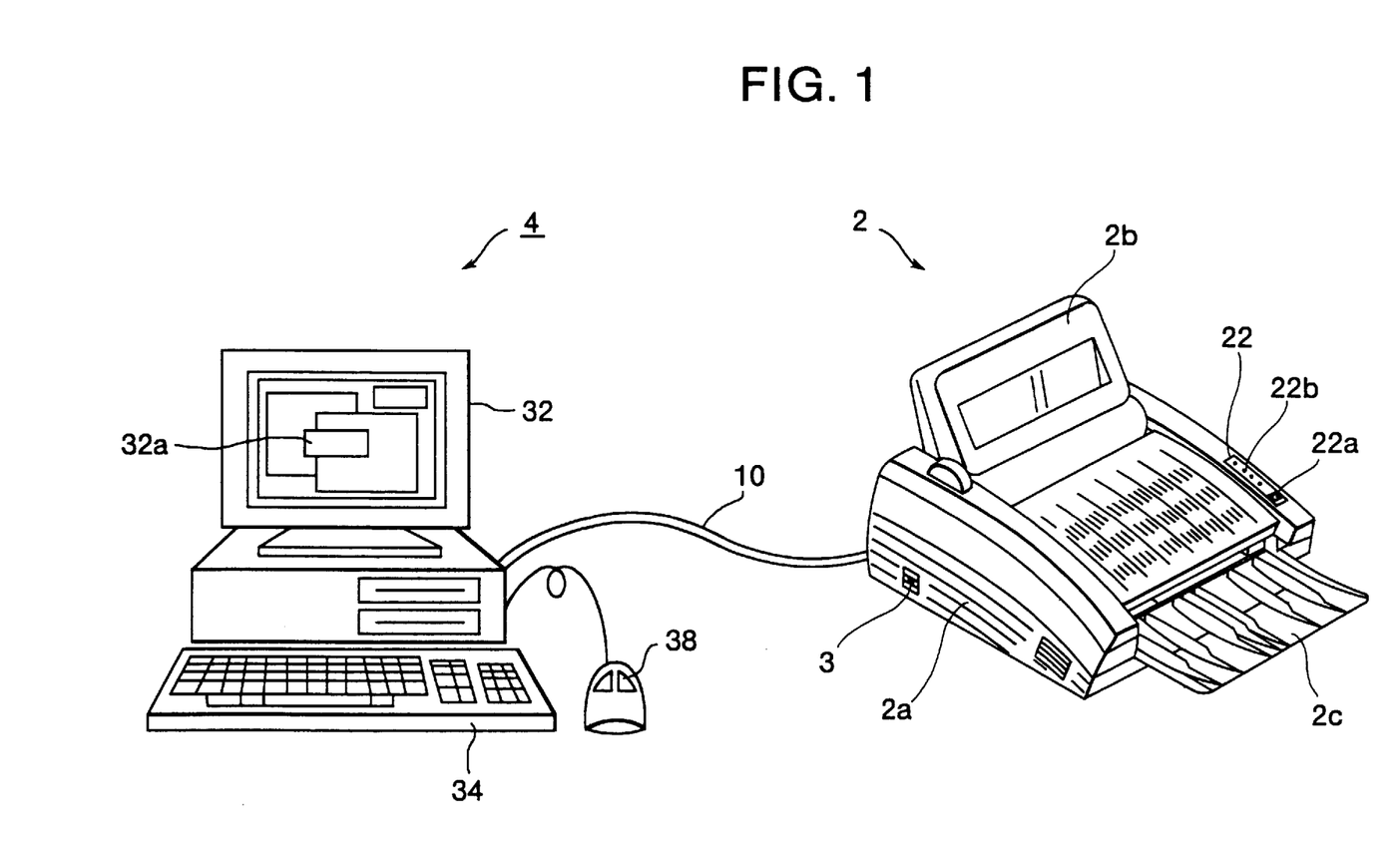
FIG. 1 is an explanatory diagram showing a personal computer and a laser printer according to a first embodiment of the present invention.
Figure 2:
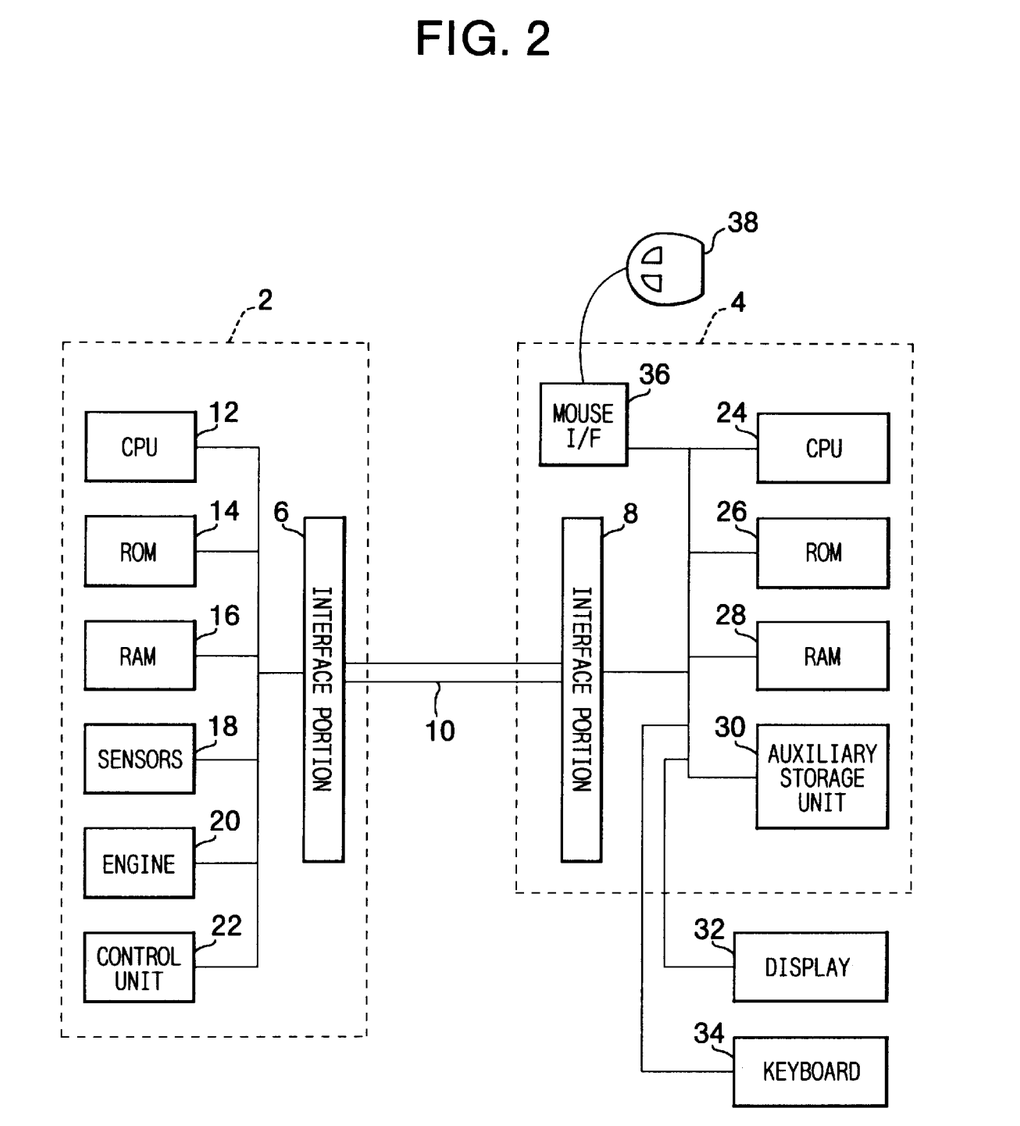
FIG. 2 is a block diagram showing the configuration of the personal computer and the laser printer.

A first embodiment of the control device will be described below with reference to FIGS. 1 through 3.

The control device of the first embodiment includes a personal computer 4 connected to a laser printer 2. The laser printer 2 is connected to the personal computer 4 by a parallel printer cable 10 via interface units 6 and 8.

The laser printer 2 includes a main body 2a, a paper feed unit 2b, and a paper discharge tray 2c. During the printing process, one sheet of paper is fed at a time from a paper feed unit 2b into an image forming unit (not shown). After a toner image is formed on the sheet of paper, the toner is heated by a fixing unit (not shown) to be thermally fixed on the paper. Then, the paper is discharged onto the paper discharge tray 2c.

Internally, the laser printer 2 includes the interface unit 6 for interfacing with the personal computer 4 in accordance with a predetermined printer parallel interface standard such as a standard determined by Centronics Inc.; a CPU 12 for executing various processes according to various control programs; a ROM 14 storing the various control programs; a RAM 16 for use as a work area for calculations to be executed by the CPU 12 and for storing results of those calculations and various settings; various sensors 18, including a paper feed sensor, a paper discharge sensor, and a toner sensor; and an engine 20 including a main motor for driving mechanical portions in the laser printer 2. A control unit 22 and a power switch 3 are also provided in the main body 2a of the laser printer 2 as shown in FIG. 1. Those components 12, 14, 16, 18, 20, and 22 are connected to the interface 6 via bus line. The control unit 22 includes a push-button switch 22a for providing simple instructions to the laser printer 2, and LED lights 22b for displaying the status of instruction controls to allow the user to set prescribed conditions.

The personal computer 4 includes the interface unit 8; a CPU 24; a ROM 26; a RAM 28; an auxiliary storage unit 30; a display 32; a keyboard 34; and a mouse interface 36 which are connected to one another via bus line. A mouse unit 38 is connected to the mouse interface 36.

The interface unit 8 is for interfacing with the laser printer 2 in accordance with the predetermined parallel interface standard. The CPU 24 is for executing various processes according to various control programs stored in the ROM 26 and the RAM 28. The ROM 26 stores therein various control programs. The auxiliary storage unit 30 such as a hard disk is for storing data and external programs, such as operating system programs, application programs, and a printer driver program shown in FIG. 3, which are retrieved from auxiliary storage media such as floppy disks, CD-ROMs, magnetooptical disks, and the like. The RAM 28 is for storing data and programs such as the operating systems, the application programs, and the printer device drivers, which are read from the auxiliary storage unit 30 when these programs are executed. The RAM 28 is also for storing results of calculations attained by the CPU 24 and various settings. The display 32 is for displaying the results of calculations, menus, the monitor status of the printer 2, and the like. The keyboard 34 is for enabling a user to input various instructions. The mouse unit 38 is for moving a mouse cursor displayed on the display 32 and for allowing the user to input instructions. The mouse unit 38 is for communicating data of such movement and instructions with the CPU 24 via the mouse interface 36.

The personal computer 4 and the laser printer 2 exchange handshake signals needed for transmitting data. The handshake signals include strobe signals and acknowledge signals. The personal computer 4 transmits print data and instruction commands to the printer 2. The laser printer 2 executes printing processes according to the instruction commands, and outputs its status to the personal computer 4 in the form of status signals.

As described above, each of the operating system programs, application programs, and printer driver programs has been recorded in an auxiliary storage medium such as a floppy disk, a CD-ROM, or a magnetooptical disk. When each program is installed into the computer 4, the program is retrieved from the auxiliary storage media into the auxiliary storage unit 30.

Each printer driver program is designed in correspondence with a specific operating system program. The printer driver program has been recorded in a printer driver storage medium such as a floppy disk, a CD-ROM, or a magnetooptic disk. It is noted that a problem application program list has also been stored in the printer driver storage medium along with the printer driver. The problem application program list is a file containing the names or codes of problem-inducing application programs that will cause conflicts when being executed simultaneously with the printer device driver when the printer device driver displays the status monitor, resulting in hang ups or forced termination of the application program or of the printer device driver. When the printer device driver is installed in the auxiliary storage unit 30, the file is also retrieved and stored in the auxiliary storage unit 30 together with the printer device driver.

With the above-described structure, the personal computer 4 is installed with: one or more operating system programs, one or more application programs for each operating system program, and a printer driver program for each operating system program. It is now assumed that a program of one operating system OS is installed in the auxiliary storage unit 30, that a plurality of application programs are installed in the auxiliary storage unit 30 for the operating system OS, and one printer driver program PD is installed in the auxiliary storage unit 30 for the operating system OS. When each program is executed, the program is loaded from the storage unit 30 into the RAM 28 and is executed by the CPU 24 in a time-divisional manner.

That is, when the computer 4 is turned on, the program of the operating system OS is first loaded from the storage unit 30 into the RAM 28. Thus, the operating system program is activated. After the operating system is thus started, when the user selects one or more application programs, the selected application programs are further loaded from the storage unit 30 into the RAM 28. Thus, those programs are also activated to run. That is, those programs are also executed by the CPU 24 in a time-divisional manner. The display 32 is used commonly by the thus running application programs in the operating system OS because the operating system OS is capable of handling simultaneous execution of a plurality of application programs.

It is assumed that while the one or more application programs are thus running, the user operates one application program AP to select a printing operation. As a result, the printer device driver PD is activated by commands issued from the application program AP. In more concrete terms, when receiving the printing instruction from the operator, the application program AP requests printing operation to the operating system OS, whereupon the operating system OS issues a start instruction to the printer device driver (device driver) PD. As a result, the printer device driver PD is activated. In other words, the printer driver PD is loaded from the storage unit 30 into the RAM 28. Thus, the printer driver PD starts running. That is, the printer device driver PD is executed together with the already-executed programs by the CPU 24 in a time-divisional manner.

Next, the printer device driver process attained by the printer device driver PD will be described with reference to FIG. 3.

First, the CPU 24 checks the setting mode for the status monitor in S100. The mode of displaying or not displaying the status monitor has been set during a separate mode selecting process (not shown). The mode selecting process is achieved immediately after the printer device driver PD is retrieved from the printer device driver storage medium and installed in the auxiliary storage unit 30. During the mode selecting process, a user is allowed to select his/her desired printer driver setting mode to or not to display the status monitor of the printer 2. Data of the user's selected mode is also stored in the auxiliary storage unit 30 (hard disk). When the operating system OS is started, the status monitor mode data is retrieved from the auxiliary storage unit 30 and written in a prescribed storage area of the RAM 28. This status monitor mode data is retrieved from the RAM 28 in S100 to determine whether or not the user has selected to display the status monitor.

When the status monitor mode data indicates that the user has selected not to display the status monitor, then the status monitor setting is set to "off" in S200. The printing process is then executed in S300 during which the personal computer 4 transmits data signals to the laser printer 2 according to the predetermined protocol. The laser printer 2 performs printing operation according to the received data, and sends status signals back to the personal computer 4.

During this process, the device driver PD does not display anything at all in the display 32 because the status monitor has been set to "off" in S200. Accordingly, no information received from the laser printer 2 in the form of status signals is displayed. Of course, the application program AP that has activated the device driver PD may be designed to control the display 32 to display a simple message such as "Printing" on the display 32.

Thus, the status of the printer will not be displayed by the printer device driver PD in this case. There is no possibility that the personal computer 4 will hang up or the already-activated application programs will be forcibly terminated even if an application program, which cannot be executed or with which the device driver cannot be executed while the status of the device is displayed, is running simultaneously.

When the status monitor mode data read in S100 indicates that the user has selected to display the status monitor, on the other hand, then the printer device driver PD requests the operating system OS to inform the printer device driver PD of the name of the application program AP that has issued the printing command in S400. It is noted that the printer driver PD may request the operating system OS to inform the printer device driver PD of code data such as an ID number specifying the application program AP. The CPU 24 compares the informed data indicative of the printing command-issued application program AP with the list of problem application programs in S500.

When the informed data of the application program exists in the problem application program list ("yes" in S500), then the status monitor setting is set to "off" in S200. The printing process is then executed in S300 without displaying the status of the printer 2. Thus, the printing operation is performed in the same manner as that the user has selected not to display the status monitor.

When the informed application program data is not in the problem application program list ("no" in S500), on the other hand, the application program AP that has instructed printing is determined not to cause any problems. Therefore, the status monitor is set to "on" in S600. Then, the printing process is attained in S300, during which print data is transmitted to the laser printer 2, and a new display area, or window, 32a is allocated on the display 32. The status signals received from the laser printer 2 are analyzed by the CPU 24 and displayed as text in the window 32a. In this case, because the printer device driver PD can display the status monitor 32a without occurring any problems or troubles, the operator can monitor the status of the laser printer 2 without leaving the personal computer 4. When the printer runs out of paper or a paper jam occurs, a message indicating the problem is displayed in the window 32a. Accordingly, the user can be immediately informed and can proceed to the printer to handle the problem, which increases the efficiency of the user's work.

As described above, according to the present embodiment, the auxiliary storage unit 30 stores therein the problem application program list. The CPU 24 judges in S400 and S500 whether or not data indicative of the application program AP exists in the problem application program list. Based on the judged result, the CPU 24 controls a status monitor display operation in S200 and S600 while performing a printing operation in S300.

As described above, according to the method of the present embodiment, the computer 4 controls whether or not to display the status monitor of the printer device 2. When a certain application program AP outputs a printing command and the status monitor of the printer is set to be displayed, data indicative of the application program AP is first obtained and compared with the list of problem application programs. If the name is not in the list, then the printing status monitor is displayed. However, if the name is found in the list, the status monitor is not displayed. This method increases efficiency of work for the user and prevents such problems as the computer hanging up or the programs being forcibly closed.

Next, a monitor display control device according to a second preferred embodiment of the present invention will be described, while referring to the accompanying drawings wherein like parts and components are designated by the same reference numerals to avoid duplicating description.

Figure 4:
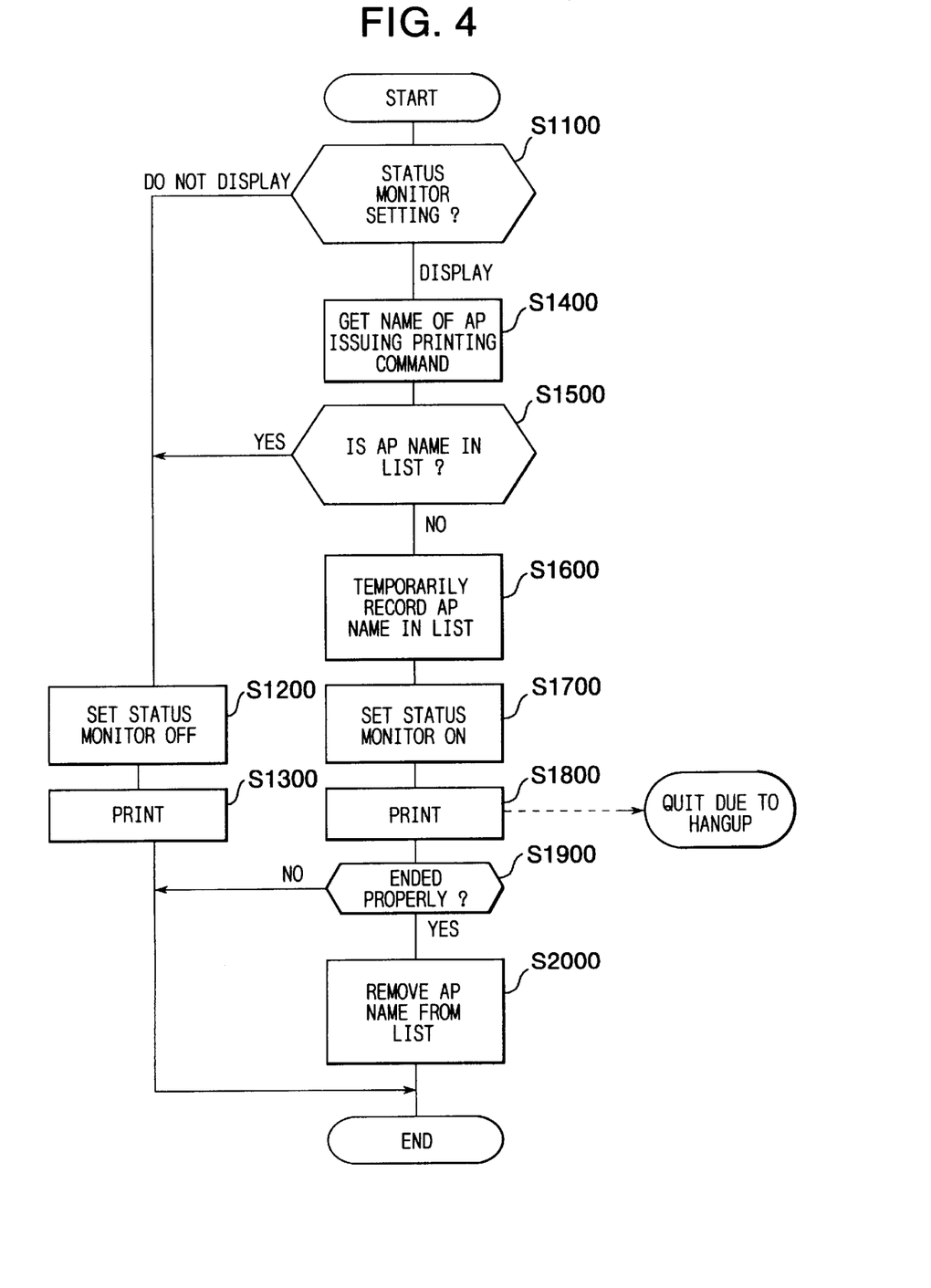
FIG. 4 is a flowchart showing the process for a printer device driver of a second embodiment.

In this second embodiment, only the printer device driver process attained by the printer device driver PD differs from that of the first embodiment. Thus, all other descriptions will be omitted. The printer device driver process of the second embodiment is shown in FIG. 4.

The printer device driver is activated in the same manner as in the first embodiment. When the printer device driver is activated, the CPU 24 first checks the setting mode for the status monitor in S1100. When the setting mode data indicates that the user has selected not to display the status monitor, then the status monitor setting is set to "off" in S1200, and the printing process is executed in S1300. During the printing process, the printer device driver PD does not control the display 32 to display the status monitor. The operations performed in S1200 and S1300 are the same as those in S200 and S300 of the first embodiment.

When the status monitor mode data read in S1100 indicates that the user has selected to display the status monitor, then the printer device driver PD requests the operating system OP to inform name or code data indicative of the application program AP that has issued the printing command in S1400. The informed name or code is then compared with the list of problem application programs in S1500. Here, the operations in S1400 and S1500 are the same as those in S400 and S500 of the first embodiment.

When the informed name or code exists in the problem application program list ("yes" in S1500), then the status monitor setting is set to "off" in S1200, and the printing process is executed in S1300. During this printing process, the printer device driver PD does not control the display 32 to display the printer status monitor.

When the informed name or code is not in the problem application program list ("no" in S1500), on the other hand, the application program AP is assumed not to cause any problems described above, but is temporarily entered in the problem application program list in S1600. The status monitor is then set to "on" in S1700, and the printing process is executed in S1800. During the printing process, print data is transmitted to the laser printer 2 and printed thereby, and a new window 32a is allocated on the display 32. The status signals, which are transmitted from the laser printer 2 during the printing process, are analyzed by the CPU 24 and displayed as text in the window 32a.

When the printing process has ended, the CPU 24 determines whether or not the printing process has been completed without any problems in S1900. For example, when a problem has occurred in the application program AP that has issued the printing command and the problem has been detected by the operating system OS, the operating system OS has forcibly closed the application program AP. In this case, the application program AP cannot send commands or data to the printer device driver PD any more, and therefore the printer device driver PD cannot send data signals to the laser printer 2. It is therefore determined that the printing process has not been ended properly when the above-described signal absent-condition continues for a long period of time. It is also determined that the printing process has not been ended properly when the printer device driver PD detects the present condition of the application program AP that has issued the printing command and detects that the application program AP has already been shut down.

When the CPU 24 thus determines that the printing process has not ended properly ("no" in S1900), the CPU 24 immediately ends the process of the printer device driver PD. As a result, the name or code indicative of the application program AP, which has been temporarily entered in the problem application program list, will remain in the list as a permanent entry. Accordingly, the next time this process is executed with the same application program, the name or code of the application program will exist in the problem application program list, causing the status monitor to be set to "off". This will prevent the application program from being forcibly shut down again.

On the other hand, when the printing process has ended properly ("yes" in S1900), on the other hand, the name or code of the application program AP that has issued the print command is removed from the problem application program list in S2000 before the printer device driver process is ended. The name or code of the application program AP, which has been entered temporarily in the problem application program list in S1600, is erased, and therefore the name or code of the application program will not exist in the problem application program list. Accordingly, when that application program issues a print command at the next time, display of the status monitor will not be prohibited.

When the application program AP that has issued the print command causes the computer 4 to hang up during the printing process of S1800, the processes for all of the programs running on the personal computer 4 are stopped, and the print device driver process ends as indicated by the dotted line. As a result, the name or code of the application program AP, which has been temporarily entered in the problem application program list in S1600, remains in the list as a permanent entry. Thus, after the personal computer 4 is restarted, when the device driver process is executed again with the same application program, the name or code of the application program that has caused the personal computer 4 to hang up will exist in the problem application program list ("yes" in S1500), causing the status monitor to be set to "off" in S1200 and the printing process to be executed in S1300 without displaying the status monitor. This will prevent the personal computer 4 from hanging up again.

According to this control of the second embodiment, when new application programs, which are not yet listed in the problem application program list but which will cause the above-described problems, are executed to activate the printer driver while displaying the status monitor, the computer will hang up or the application programs will be forcibly shut down. However, such problems will cause the printer device driver process to end before deleting the name or code of the application program from the problem application program list. Accordingly, whenever the process is repeated with the same application program, the name or code of the application program will be found in the problem application program list, preventing the status monitor from being displayed and, therefore, avoiding an occurrence of the same problems.

As described above, according to the second embodiment, the CPU 24 judges in S1400 and S1500 whether data of the application program AP exists in the problem application program list. Based on the judged result, the CPU 24 controls the status monitor display process in S1200 and S1700 while performing a printing operation in S1300 and S1800. The CPU 24 further adds data of the application program that has induced problems into the problem application program list in S1600, S1900, and S2000.

Figure 3:
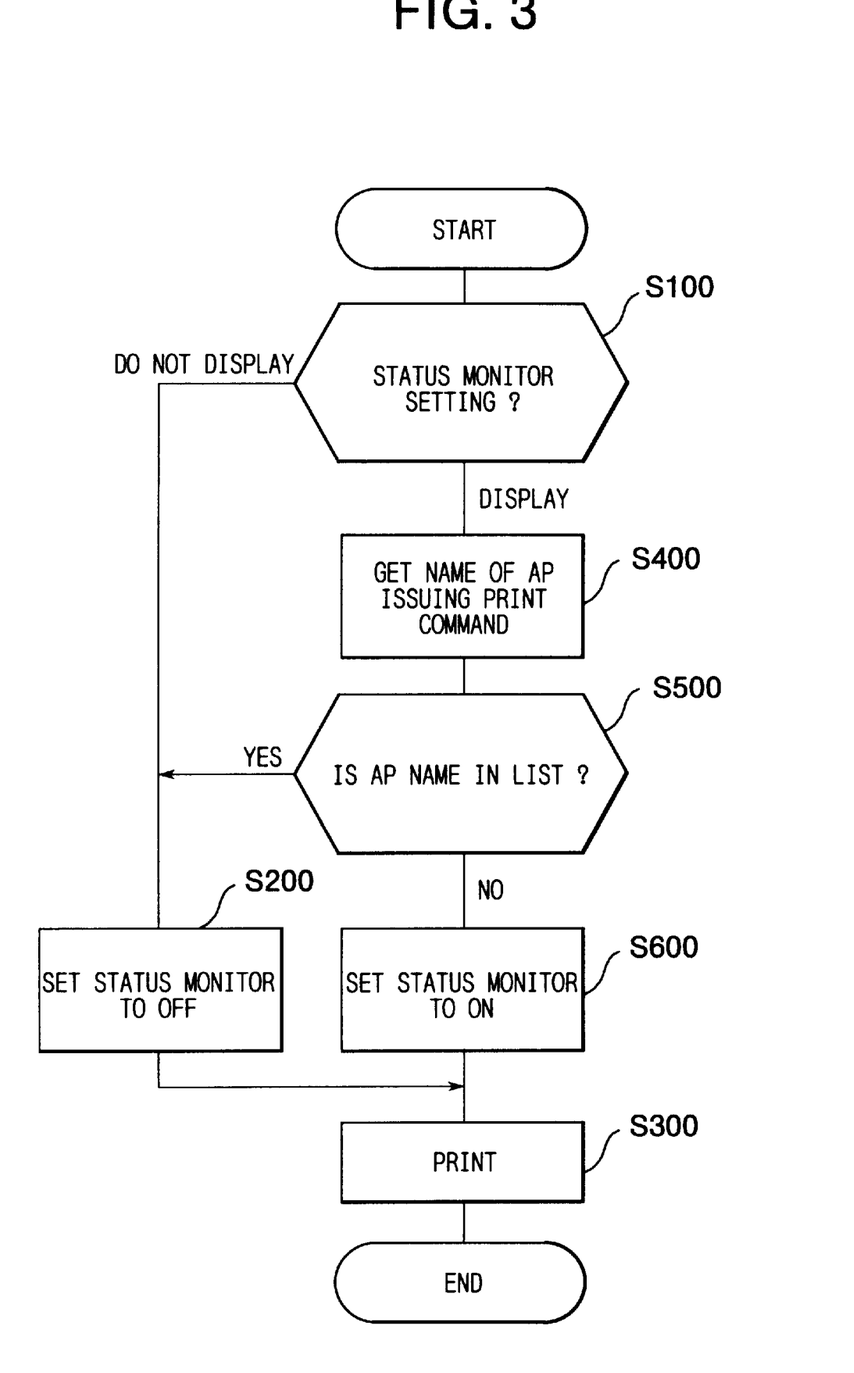
FIG. 3 is a flowchart showing the process for a printer device driver of the first embodiment.

As described above, the printer device driver processes of FIGS. 3 and 4 are designed in the form of software of a printer device driver. This software program is initially stored in the storage medium, such as a floppy disk, a CD-ROM, or a magneto-optical disk. The software program is installed as the printer device driver into the auxiliary storage unit 30 such as a hard disk. The printer device driver is then loaded into the memory area 28 when printing instruction is issued from the operating system OS. It is also desirable to install or load the software program into several computers via a network.

While two exemplary embodiments of this invention have been described in detail, those skilled in the art will recognize that there are many possible modifications and variations which may be made in these exemplary embodiments while yet retaining many of the novel features and advantages of the invention. Accordingly, all such modifications and variations are intended to be included within the scope of the appended claims.

For example, in the above-described embodiments, only the application program AP that has issued the printing command is compared with the problem application program list. Especially in the second embodiment, the application program AP is temporarily stored in the problem application program list. However, the printer device driver PD may be designed to compare all the presently-running application programs (i.e., all the application programs that are presently loaded in the RAM 28 and are time-divisionally activated by the CPU 24) with the problem application program list. In other words, the printer device driver PD may compare, with the problem application program list, all the application programs which have been already activated when the printer driver is activated. If any of the presently-running application programs do not exist in the file, the status monitor is displayed. If at least one of the presently-running application programs exists in the file, the status monitor is not displayed. Additionally, in the same manner as in the second embodiment, all the presently-running application programs may be temporarily recorded in the problem application program list. If it is detected that the temporarily-recorded programs have induced no problems while the status monitor is displayed, the application programs are deleted from the list. However, once a problem occurs, the application programs will remain in the list.

In the first embodiment, the problem application program list is prepared in advance for containing names or codes of problem application programs. However, it may be possible to prepare a problem-free list which contains names or codes of application programs that do not cause problems. The processes in S600 and S300 may be executed when the application program name exists in the problem-free file, while the processes in S200 and S300 may be executed when the application program name does not exist in that file. That is, the printer device driver PD may be designed to compare, with the problem-free list, the application program AP that has issued the printing command. However, it is possible to compare, with the problem-free list, all the presently-running application programs (i.e., all the application programs that are presently loaded in the RAM 28 and are time-divisionally executed by the CPU 24). In other words, the printer device driver PD may compare, with the problem-free list, all the application programs which have been already activated when the printer driver is activated. If all of the presently-running application programs exist in the file, the status monitor is displayed. If at least one of the presently-running application programs does not exist in the file, the status monitor is not displayed.

Especially, in the second embodiment, the application program name is only deleted from the problem application program list in S2000. However, in addition to deleting the application program name from this list, the program name can be added to the problem-free application program list in the same step. In this way, the informed application program name may first be searched for in the list of problem application programs in S1500. When the application program name does not exist in the list, the name may be further searched for in the problem-free application program list in the same step. When the application program name exists in this problem-free list, the process of S1600 may be skipped and the process of S1700 executed, removing the necessity of temporarily storing the same application program name over and over.

According to the second embodiment, the name or code of the application program AP that has issued the printing instruction is temporarily stored in the problem program list, and the name or code of the program AP is deleted when no problem is occurred while the status monitor is displayed. However, such a temporary adding operation can be deleted. When it is actually detected that a certain active application program, which is not found in the list, produces problems while the device driver displays the status of the device, the name or code of the application program can be added to the list. These application programs are probably new application programs that have not been tested when the list is initially created. By adding these application programs in the list, future problems with these application programs can be prevented. It may be possible to add in the list all the application programs that are running when the problem occurs during the status monitor displaying operation.

The above-described embodiments are related to a printer driver for driving the printer 2. However, the present invention can be directed to other various device drivers for driving other various devices such as scanners and facsimile machines. Each of the device driver may be designed to control the display 32 to display the status of the device that the device driver controls. The display 32 is used commonly by one or more running application programs in the operating system OS because the operating system OS is capable of handling simultaneous execution of a plurality of application programs. The device driver controls the device according to instructions issued from one of these application programs.

As described above, according to the device driver control method of the embodiments, a list of problem application programs is created in advance for listing several problem application programs which cannot be executed or with which the device driver cannot be executed when the status of the device is displayed. The application program, which has issued printing instruction to activate the device driver, is compared with the thus prepared list of problem application programs. Based on the comparison results, it is determined whether or not to display the status of the device on the display unit via the device driver. The status of the device is displayed when data indicative of the application program does not exist in the problem application program list. The status of the device is not displayed when data indicative of the application program exists in the problem application program list.

According to the modification, all the active application programs, which have been activated when the device driver is activated, are compared with the prepared list. When any one of the active application program is found in the list, the status of the device is not displayed, thereby preventing computer hang ups or forced closing of the application programs or the device driver and avoiding the loss of important data that is still being edited. However, when none of the active application programs are found in the prepared list, the status of the device is displayed because it can be confirmed that the above-described problems will not occur. The user can continue working at the computer while monitoring the device. When a problem occurs with the device, the user is informed by the status monitor and can immediately see to the problem, increasing efficiency of the user's work.

Especially, according to the second embodiment, the application program that has activated the device driver is temporarily recorded in the list. If the thus temporarily-recorded application program is executed properly while the status monitor is being displayed, then the temporarily-stored application program is deleted from the list. Because it is impossible for the device driver to record an application program in the list after the computer hangs up or the device driver is forcibly closed, the application program is assumed to cause problems and is temporarily recorded in the list before the status of the device is displayed. If the temporarily-recorded program induces no problems while the status monitor is displayed, the application program is deleted from the list. However, once a problem occurs, the application program will remain in the list.

In contrast to the above-described method, according to the modification, a list of problem-free application programs is created in advance for listing up problem-free application programs which can be executed and with which the device driver can be executed when the status of the device is displayed. All the application programs already being executed when the device driver is activated or the application program that has activated the device driver is compared with the list. Based on the results of the comparisons, it is determined whether or not to display the status of the device via the device driver. That is, it is determined to display the status of the device when all the application programs or the device-driver-activated application program exists in the list. It is determined not to display the status of the device when at least one of the active application programs or the device driver-activated application program does not exist in the list.

What is claimed is:

1. A method for driving a device while executing at least one application program, the method comprising the steps of:

activating at least one application program; and activating a device driver, according to one of the activated at least one application program, thereby controlling a device corresponding to the device driver, wherein the device driver performs the steps of:

(a) comparing one of the activated at least one application program with a list of predetermined application programs and providing comparing results;

(b) determining, based on the comparing results, whether or not to control a display device to display a status of the device being driven by the device driver; and (c) driving the device while displaying the status of the device when determination made in step (b) is affirmative; and (d) driving the device while not displaying the status of the device when determination made in step (b) is negative.

2. A method as claimed in claim 1, wherein the application program, according to which the device driver is activated, is compared with the list of the predetermined application programs.

3. A method as claimed in claim 1, wherein each of the at least one application program, which has been activated when the device driver is activated, is compared with the list of the predetermined application programs.

4. A method as claimed in claim 1, wherein the device driver drives a printer device.

5. A method as claimed in claim 1, wherein the list of the predetermined application programs includes a problem program list which stores therein data indicative of at least one problem application program which is determined to cause a problem when the problem application program and the device driver are activated while the device driver controls the display to display the status of the device being driven.

6. A method as claimed in claim 5, wherein the application program, according to which the device driver is activated, is compared with the problem program list, and wherein the step (b) determines to control the display device to display the status of the device being driven by the device driver when data indicative of the application program is not stored in the problem program list, the step (b) determining to control the display device not to display the status of the device when data indicative of the application program is stored in the problem program list.

7. A method as claimed in claim 6, further comprising the steps of:

detecting whether or not a problem occurs when the already-activated at least one application program and the device driver are executed while controlling the display to display the status of the device; and adding the application program, according to which the device drive is executed, into the problem program list when some problem occurs.

8. A method as claimed in claim 6, further comprising the steps of:

temporarily adding the application program, according to which the device driver is activated, into the problem program list;

detecting whether or not a problem occurs when the application program and the device driver are executed while controlling the display to display the status of the device; and deleting the added application program from the problem program list when no problem occurs.

9. A method as claimed in claim 1, wherein the list of the predetermined application programs includes a problem-free program list which stores therein data indicative of at least one application program which is determined not to cause a problem when the application program and the device driver are executed while the device driver controls the display device to display the status of the device.

10. A control device for driving a device while executing at least one application program, the control device comprising:

means for activating at least one application program; and means for activating a device driver, according to one of the activated at least one application program, thereby controlling a device corresponding to the device driver; and means for storing a list of predetermined application programs, wherein the device driver activating means includes:

means for comparing one of the activated at least one application program with the list of predetermined application programs and providing comparing results;

means for determining, based on the comparing results, whether or not to control a display device to display a status of the device being driven by the device driver; and means for driving the device according to the activated device driver while displaying the status of the device being driven when determination made by the determination means is affirmative and for driving the device according to the activated device driver while not displaying the status of the device being driven when determination made by the determination means is negative.

11. A control device as claimed in claim 10, wherein the comparing means compares the application program, according to which the device driver is activated, with the list of the predetermined application programs.

12. A control device as claimed in claim 10, wherein the comparing means compares each of the at least one application program, which has been activated when the device driver is activated, with the list of the predetermined application programs.

13. A control device as claimed in claim 10, wherein the device driver drives a printer device.

14. A control device as claimed in claim 10, wherein the list of the predetermined application programs includes a problem program list which stores therein data indicative of at least one problem application program which is determined to cause a problem when the problem application program and the device driver are activated while the device driver controls the display to display the status of the device being driven.

15. A control device as claimed in claim 10, further comprising:

means for detecting whether or not a problem occurs when the already-activated at least one application program and the device driver are executed while controlling the display to display the status of the device; and means for adding at least one of the at least one application program into the problem program list when some problem occurs.

16. A control device as claimed in claim 14, further comprising:

means for temporarily adding the application program, according to which the device driver is activated, into the problem program list;

means for detecting whether or not a problem occurs when the application program and the device driver are executed while controlling the display to display the status of the device; and means for deleting the added application program from the problem program list when no problem occurs.

17. A control device as claimed in claim 10, wherein the list of the predetermined application programs includes a problem-free program list which stores therein data indicative of at least one application program which is determined not to cause a problem when the application program and the device driver are executed while the device driver controls the display device to display the status of the device.

18. A program storage medium for storing data of a program indicative of a process for driving a device, the program comprising:
（a) a program of comparing one of the at least one application program, which has been already activated when the process is started, with a list of predetermined application programs and providing comparing results;
（b) a program of determining, based on the comparing results, whether or not to control a display device to display a status of the device being driven by the device driver; and
（c) a program of driving the device while displaying the status of the device when determination made in step (b) is affirmative; and
（d) a program of driving the device while not displaying the status of the device when determination made in step (b) is negative.

19. A program storage medium as claimed in claim 18, further storing data of the list of the predetermined application programs, wherein the list of the predetermined application programs includes a problem program list which lists data indicative of at least one problem application program which is determined to cause a problem when the problem application program and the device driver are activated while the device driver controls the display to display the status of the device being driven.

20. A program storage medium as claimed in claim 18, further storing data of the list of the predetermined application programs, wherein the list of the predetermined application programs includes a problem-free program list which stores therein data indicative of at least one application program which is determined not to cause a problem when the application program and the device driver are executed while the device driver controls the display device to display the status of the device.

21. A method for driving a device, connected to a computer, while executing at least one application program, the computer being capable of simultaneously executing one or more application programs according to a multitasking operating system and which is capable of executing a device driver for driving the device according to the one or more application programs, the computer being connected to a display device which is capable of displaying a status monitor indicative of a status of the device driven by the device driver, the method comprising the steps of:
activating at least one application program; and
activating a device driver, according to one of the activated at least one application program, thereby controlling a device corresponding to the device driver, wherein the device driver performs the steps of:
（a) comparing one of the activated at least one application program with a list of predetermined application programs and providing comparing results;
（b) determining, based on the comparing results, whether or not to control a display device to display a status of the device being driven by the device driver; and
（c) driving the device according to the activated device driver while displaying the status of the device being driven when determination made in step (b) is affirmative; and
（d) driving the device according to the activated device driver while not displaying the status of the device being driven when determination made in step (b) is negative.

22. A control device for controlling a device while executing at least one application program, the control device comprising:
application program executing means capable of simultaneously executing one or more application programs according to a multitasking operating system;
device driver executing means capable of executing a device driver for driving a device according to one of the one or more application programs;
list storing means for storing a list of predetermined application programs;
display control means capable of controlling a display to display a status of the device driven by the device driver;
comparing means for comparing at least one of the executed one or more application program with the list of the predetermined application programs;
determining means for determining, based on the comparing results, whether or not to control the display to display the status of the device driven by the device driver; and
driving means for driving the device according to the executed device driver while performing the determined control on the display.

* * * * *